(12) United States Patent
Zhang

(10) Patent No.: US 10,412,748 B2
(45) Date of Patent: Sep. 10, 2019

(54) ENHANCED CARRIER AGGREGATION SCHEDULING METHOD AND DEVICE IN USER EQUIPMENT AND BASE STATION

(71) Applicant: Shanghai Langbo Communication Technology Company Limited, Shanghai (CN)

(72) Inventor: XiaoBo Zhang, Shanghai (CN)

(73) Assignee: Shanghai Langbo Communication Technology Company Limited, Shanghai (CN)

( * ) Notice: Subject to any disclaimer, the term of this patent is extended or adjusted under 35 U.S.C. 154(b) by 108 days.

(21) Appl. No.: 15/537,633

(22) PCT Filed: Dec. 28, 2015

(86) PCT No.: PCT/CN2015/099255
§ 371 (c)(1),
(2) Date: Jun. 19, 2017

(87) PCT Pub. No.: WO2016/101928
PCT Pub. Date: Jun. 30, 2016

(65) Prior Publication Data
US 2017/0353965 A1 Dec. 7, 2017

(30) Foreign Application Priority Data
Dec. 26, 2014 (CN) .......................... 2014 1 0852934

(51) Int. Cl.
*H04W 72/12* (2009.01)
*H04W 72/04* (2009.01)

(52) U.S. Cl.
CPC ........... *H04W 72/12* (2013.01); *H04W 72/04* (2013.01); *H04W 72/042* (2013.01);
(Continued)

(58) Field of Classification Search
CPC ..................................................... H04W 72/12
(Continued)

(56) References Cited

U.S. PATENT DOCUMENTS

2014/0355540 A1* 12/2014 Accongiagioco ...........................
H04W 72/1226
370/329

FOREIGN PATENT DOCUMENTS

| CN | 101969697 A | 2/2011 |
| CN | 103929816 A | 7/2014 |
| WO | 2013168828 A1 | 11/2013 |

OTHER PUBLICATIONS

Motorola; "PDCCH Design for Cross-Carrier Operation Using CIF"; 3GPP TSG RAN WG1 Meeting #59 R1-094830, Agenda Item 7.2.1.1; Nov. 13, 2009.
(Continued)

*Primary Examiner* — Peter G Solinsky
(74) *Attorney, Agent, or Firm* — Stevens & Showalter, L.L.P.

(57) ABSTRACT

Disclosed are an enhanced carrier aggregation (CA) scheduling method and device in a user equipment (UE) and a base station, the method comprising: in a first step, a UE receives a high-level signaling determining K sets of configuration information, the configuration information comprising {a first index, a second index, a third index, and working frequency band information}; in a second step, the UE receives, at a first service cell, a first signaling, the first signaling comprising a fourth index and scheduling information; and in a third step, the UE determines a second service cell according to first configuration information and the fourth index in the first signaling. The present disclosure reduces the number of bits in downlink control information (DCI), thus conserving an air interface resource, or improving the receiving performance of the DCI. Furthermore, the
(Continued)

present disclosure instructs the third index not to modify the number of bits of the DCI by utilizing an existing carrier indicator field (CIF), thus maximally maintaining compatibility with an existing system.

16 Claims, 3 Drawing Sheets

(52) U.S. Cl.
 CPC .... *H04W 72/0413* (2013.01); *H04W 72/0453* (2013.01); *H04W 72/1289* (2013.01)

(58) Field of Classification Search
 USPC .......................................................... 370/329
 See application file for complete search history.

(56) References Cited

OTHER PUBLICATIONS

Li, Dandan; International Search Report and Written Opinion; International application No. PCT/CN2015/099255; dated Mar. 7, 2016; State Intellectual Property Office of the P.R. China; Beijing, China.

\* cited by examiner

ENHANCED CARRIER AGGREGATION SCHEDULING METHOD AND DEVICE IN USER EQUIPMENT AND BASE STATION

CROSS REFERENCE TO RELATED APPLICATIONS

This application is a U.S. National Phase application under 35 U.S.C. § 371 of International Application No. PCT/CN2015/099255, filed on Dec. 28, 2015, and claims benefit to Chinese Patent Application No. CN201410852934.8, filed on Dec. 26, 2014, all of which is hereby incorporated by reference for all purposes. The International Application was published on Jun. 30, 2016 as WO2016101928A1 under PCT Article 21 (2).

BACKGROUND

Technical Field

The present disclosure is related to a scheme for scheduling a carrier aggregation (CA), and more particular to a scheme for scheduling the CA based on Long Term Evolution (LTE) system.

Related Art

In the traditional LTE system R (release) 10 developed by 3GPP (3rd Generation Partner Project), the CA is introduced as one of the key techniques, a main idea is that user equipment (UE) may work on a plurality of carriers at the same time, and the CA may improve peak value rate of a single UE. In LTE CA, the UE is configured with one Pcell (primary cell) and one or more Scells (secondary cell). For FDD (frequency duplex division) LTE, one serving cell includes at least one downlink carrier of lone downlink carrier, one uplink carrier). For TDD (time duplex division) LTE, one serving cell includes one carrier. In LTE RIO, the UE supporting the CA may maximally be configured with five serving cells, and the UE may only transmit the PUCCH information on the Pcell.

In the existing LTE system, the CA supports a cross carrier scheduling, i.e. the base station transmits a downlink signaling on a first carrier to schedule a wireless signal transmission on the second carrier. The base station uses a CIF (carrier indicator field) in the DCI (downlink control information) to indicate a target carrier to be scheduled. The CIF is indicated by three bits located on the header of the DCI.

A new research topic (RP-132085) is adopted in the 66th plenary of 3GPP RAN (radio access network), i.e. enhanced CA. In enhanced CA topic, a maximum number of the supported serving cells is raised to 32.

For enhanced CA, an intuitive method is to increase a number of bits of the CIF (for example, the number of bits is increased to 5 bits) to ensure that the base station may schedule any target carrier. However, the above intuitive method causes an increase of total number of bits of DCI, thereby occupying more air interface resources by the DCI or reducing the receiving performance of the DCI. For the problem, the present disclosure discloses an enhanced carrier aggregation scheduling method and device.

SUMMARY

In the existing LTE system, a base station configures a cell index (an integer from 0 to 7) of the serving cell to a UE through a high layer signaling, and the cell index is unique that is directly corresponding to the CIF in the DCI. The inventor researches and discovers that in enhanced CA scenario, it is limited by a limitation of a PUCCH (physical downlink control channel) capacity, too many carriers may hardly be scheduled on one carrier. Therefore, When the UE is configured with a large number of carriers, the large number of carriers are scheduled by the DCIs of a plurality scheduling carrier, i.e. one scheduling carrier only needs to transmit the DCI for scheduling a part of carriers.

According to the above analysis, the present disclosure discloses a method in a UE, which includes the following steps:

Step A: receiving a high layer signaling to determine K sets of configuration information, the K sets of configuration information correspond to K serving cells respectively, and the configuration information comprising a first index, a second index, a third index and the working frequency band information;

Step B: receiving a first signaling on a first serving cell, the first signaling comprising a fourth index and the scheduling information;

Step C: determining a second serving cell according to a first set of the configuration information and the fourth index of the first signaling, and transporting a wireless signal on the second serving cell according to the scheduling information of the first signaling.

Wherein the first signaling is a physical layer signaling, the transporting is receiving or transmitting, the first serving cell and the second serving cell are respectively one of the K serving cells. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

Each of the first indexes of the K sets of the configuration information is unique, which means that the first index is an identifying index of the configuration information. The second index corresponds to the first index of a scheduling serving cell. The third index corresponds to the fourth index of DCI of the scheduling serving cell.

The character of the above method is that: a value of the fourth index in a given DCI of the serving cell scheduled by the given DCI is related to a transmitting serving cell of the given DCI. The fourth index of the given DCI only indicates the serving cell scheduled by the transmitting serving cell and does not need to indicate all serving cells configured for the UE, thereby reducing an indication of a number of bits needed for the fourth index.

In one embodiment, the second set of the configuration information exists and is unique. In one embodiment, the K is a positive number greater than 5. In one embodiment, the working frequency band information is one of the following:

a central frequency point and a bandwidth of one carrier, or a up frequency point and a down frequency point of one carrier. The one carrier is used for downlink transmitting, or is used for downlink and uplink transmitting at the same time.

a central frequency point and a bandwidth of each of two carrier, or an up frequency point and a down frequency point of each of two carriers. The two carrier are used for downlink transporting and uplink transporting respectively.

In one embodiment, the K serving cells are active. In one embodiment, the high layer signaling is a radio resource control (RRC) signaling. In one embodiment, the second serving cell is the first serving cell.

Specifically, according to an aspect of the present disclosure, the second set of the configuration information further includes a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

The PUCCH associated with the second serving cell is: PUCCH occupied by HARQ_ACK corresponding a downlink wireless signal that is carried on the second serving cell and PUCCH occupied by the corresponding channel status information (CSI) of the second serving cell. In one embodiment, the CSI includes one or more of {PTI (precoding type indicator), RI (rank indicator), PMI (precoding matrix indicator, CQI (Channel Quality Indicator)}.

In one embodiment, each of the K sets of the configuration information includes a fifth index. In one embodiment, the third serving cell is the second serving cell. In one embodiment, the third serving cell is the first serving cell.

Specifically, according to an aspect of the present disclosure, the fourth index is indicated by three bits of the first signaling.

In one embodiment, the fourth index reuses CIF bits of the first signaling.

Specifically, according to an aspect of the present disclosure, the first index and the second index are respectively indicated by five bits.

In one embodiment, the third index is indicated by three bits.

The present disclosure discloses an enhanced carrier aggregation scheduling method in a base station, which includes the following steps:

Step A: transmitting a high layer signaling to indicate K sets of configuration information, the K sets of configuration information correspond to K serving cells respectively, and the configuration information comprising a first index, a second index, a third index and the working frequency band information;

Step B: transmitting a first signaling on a first serving cell, the first signaling comprising a fourth index and the scheduling information;

Step C: operating a wireless signal on the second serving cell according to the scheduling information of the first signaling, the second serving cell is indicated by a first set of the configuration information and the fourth index of the first signaling.

Wherein the first signaling is a physical layer signaling, the operating is transmitting or receiving, the first serving cell and the second serving cell are respectively one of the K serving cells. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

Specifically, according to an aspect of the present disclosure, the second set of the configuration information further comprises a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

Specifically, according to an aspect of the present disclosure, the fourth index is indicated by three bits of the first signaling.

Specifically, according to an aspect of the present disclosure, the first index and the second index are respectively indicated by five bits.

The present disclosure discloses a user equipment, and the UE includes:

a first module, for receiving a high layer signaling to determine K sets of configuration information, the K sets of configuration information correspond to K serving cells respectively, and the configuration information comprising a first index, a second index, a third index and the working frequency band information;

a second module, for receiving a first signaling on a first serving cell, the first signaling comprising a fourth index and the scheduling information;

a third module, for determining a second serving cell according to a first set of the configuration information and the fourth index of the first signaling, and transporting a wireless signal on the second serving cell according to the scheduling information of the first signaling.

Wherein the first signaling is a physical layer signaling, the transporting is receiving or transmitting, the first serving cell and the second serving cell are respectively one of the K serving cells. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

In one embodiment, the features of the above equipment are that: the second set of the configuration information further includes a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

The present disclosure discloses a base station equipment, and the base station equipment includes.

a first module, for transmitting a high layer signaling to indicate K sets of configuration information, the K sets of configuration information correspond to K serving cells respectively, and the configuration information comprising a first index, a second index, a third index and the working frequency band information;

a second module, for transmitting a first signaling on a first serving cell, the first signaling comprising a fourth index and the scheduling information;

a third module, for operating a wireless signal on the second serving cell according to the scheduling information of the first signaling, the second serving cell is indicated by a first set of the configuration information and the fourth index of the first signaling;

Wherein the first signaling is a physical layer signaling, the operating is transmitting or receiving; the first serving cell and the second serving cell are respectively one of the K serving cells. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

In one embodiment, the features of the above equipment are that: the second set of the configuration information further includes a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

Compared to the existing technique, the present disclosure reduces a number of bits of downlink control information (DCI), thus conserving an air interface resource, or improving the receiving performance of the DCI. Furthermore, the present disclosure instructs the third index not to modify the number of bits of the DCI by utilizing an existing carrier indicator field (CIF), thus maximally maintaining compatibility with an existing system.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
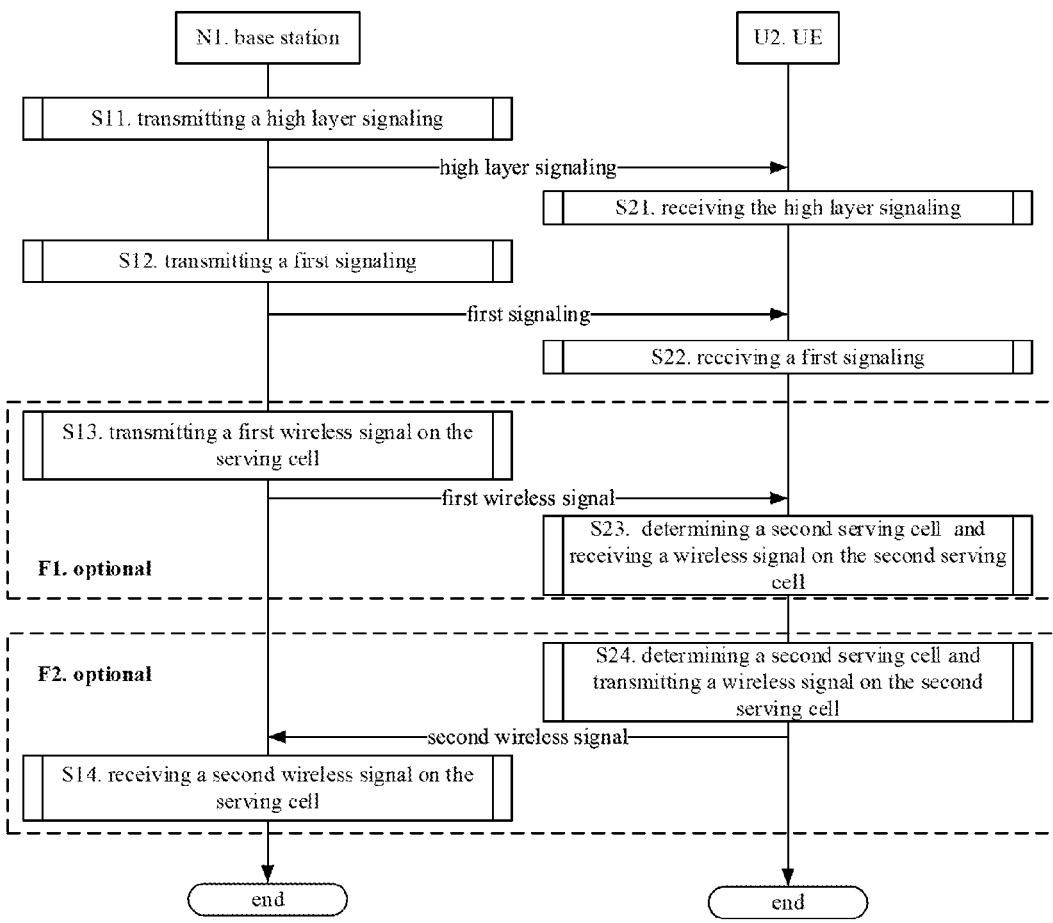
FIG. 1 is a flowchart of transmitting a wireless signal according to one embodiment of the present disclosure.

Embodiment I illustrates a flowchart of transmitting a wireless signal, as shown in FIG. 1. In FIG. 1, a base station N1 maintains a serving base station of a UE U2, the steps identified by a square frame F1 and a square frame F2 are mutually exclusive, i.e. (the step in) the square frame F1 and (the step in) the square frame F2 do not appear at the same time.

For the base station N1, in step S11, the method involves transmitting a high layer signaling to indicate K sets of configuration information, the K sets of configuration information correspond to K serving cells respectively, and the configuration information including a first index, a second index, a third index and the working frequency band information. In step S12, the method involves transmitting a first signaling on a first serving cell, the first signaling including a fourth index and the scheduling information. In step S13, the method involves transmitting the first wireless signal on the serving cell according to the scheduling information of the first signaling. In step S14, the method involves receiving a second wireless signal on the serving cell according to the scheduling information of the first signaling.

For the UE U2, in step S21, the method involves receiving the high layer signaling. In step S22, the method involves receiving a first signaling. In step S23, the method involves determining a second serving cell according to a first set of the configuration information and the fourth index of the first signaling, and receiving a wireless signal on the second serving cell according to the scheduling information of the first signaling. In step S24, determining a second serving cell according to a first set of the configuration information and the fourth index of the first signaling, and transmitting a wireless signal on the second serving cell according to the scheduling information of the first signaling.

In Embodiment I, the first signaling is a physical layer signaling, and the first serving cell and the second serving cell are respectively one of the K serving cells. The second serving cell is indicated by the first set of the configuration information and the fourth index of the first signaling. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information, a value of the third index equals to a value of the fourth index of the first signaling.

In a first exemplary embodiment of Embodiment I, the first signaling is used for scheduling a DCI of the downlink wireless signal, i.e. a DCI format of the first signaling is one of formats {1, 1A, 1B, 1C, 1D, 2, 2A, 2B, 2C, 2D} or a new defined DCI format, the steps (i.e. the steps S13 and S23) identified by the square frame F1 exists and the steps (i.e. the steps S14 and S24) identified by the square F2 does not exist.

In a second exemplary embodiment of Embodiment I, the first signaling is used for scheduling a DCI of an uplink wireless signal, i.e. a DCI format of the first signaling is one of formats {0, 4} or a new defined DCI format, the steps (i.e. the steps S13 and S23) identified by the square frame F1 does not exist and the steps (i.e. the steps S14 and S24) identified by the square F2 exists.

In a third exemplary embodiment of Embodiment I, the high layer signaling is a RRC signaling.

In a fourth exemplary embodiment of Embodiment I, the fourth index is indicated by three bits of the first signaling.

Embodiment II

Figure 2:
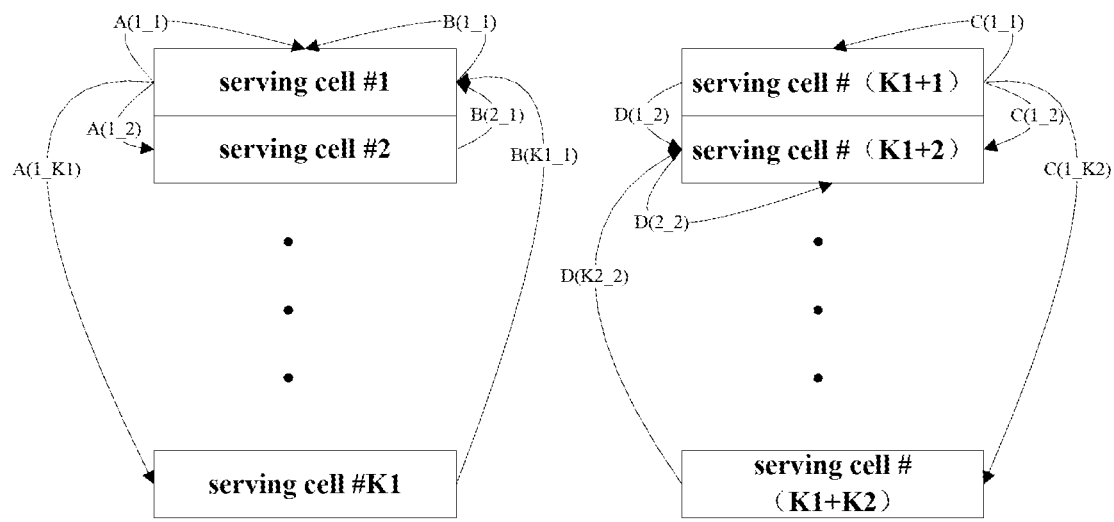
FIG. 2 is a diagram illustrating a distribution of the scheduling signaling and PUCCH according to one embodiment of the present disclosure.

Embodiment II is a diagram illustrating a distribution of the scheduling signaling and PUCCH, as shown in FIG. 2. In FIG. 2, the arrows identified by A and C indicates a downlink scheduling signaling, and the arrows identified by B and D indicated a PUCCH transmission.

The base station transmits a high layer signaling to a target UE, the high layer signaling indicates (K1+K2) sets of the configuration information, the (K1+K2) sets of the configuration information correspond to (K1+K2) serving cells respectively, the configuration includes a first index, a second index, a third index and the working frequency band information. The (K1+K2) serving cells correspond to serving cells #1-#(K1+K2) in FIG. 2. For the serving cells #1-#(K1+K2), the first indexes of the corresponding configuration information are 0, 1, . . . , K1+K2-1 respectively.

For the target UE, the second indexes of the configuration information corresponding to the serving cells #1-#K1 are 0 (equal to the first index of the configuration information of the serving cell #1), i.e. the serving cells #1-#K1 are scheduled by a downlink signaling carried on the serving cell #1, as shown by the arrows A(1_1), A(1_2), . . . , A(1_K1).

For the target UE, the second indexes of the configuration information corresponding to the serving cells #(K1+1)-#(K1+K2) are K1 (equal to the first index of the configuration information of the serving cell #K1), i.e. the serving cells #(K1+1)-#(K1+K2) are scheduled by a downlink signaling carried on the serving cell #K1, as shown by the arrows C(1_1), C(1_2), . . . , C(1_K2).

The base station transmits the first signaling to the target UE in the serving cell #1, and the first signaling includes a fourth index and the scheduling information. The target UE searches the configuration information in which the second index equals to 0 and the third index equals to the fourth index of the first signaling in the (K1+K2) sets of the configuration information, the corresponding serving cell is a target serving cell to be scheduled by the first signaling—a second serving cell.

Considering the control signaling on the serving cell #1 may only schedule the serving cells #1-#K1, the fourth index may only distinguish K1 serving cells (without distinguishing K1+K2 serving cells) namely, thus an number of bits for indicating the fourth index is less than a number of bits for indicating the first index.

In a first exemplary embodiment of Embodiment II, the configuration information further includes a fifth index, and the fifth index indicates the serving cell the associated PUCCH belongs to. The fifth indexes of the configuration information corresponding to the serving cells #1-#K1 are 0 (equal to the first index of the configuration information of the serving cell #1), i.e. the associated PUCCHs of the serving cells #1-#K1 are located on the serving cell #1, as shown by the arrows B(1_1), B(2_1), . . . , B(K1_1). The associated PUCCH of the target serving cell is used for carrying:

a HARQ_ACK of a downlink physical layer data received on the target serving cell;

CSI on the target serving cell (is obtained by measuring a downlink RS carried by the target serving cell).

In a second exemplary embodiment of Embodiment H, the configuration information further includes a fifth index, and the fifth index indicates the serving cell belonging to the associated PUCCH. The fifth indexes of the configuration information corresponding to the serving cells #(K1+1)-#(K1+K2) are K1+1 (equal to the first index of the configuration information of the serving cell #K1+2), i.e. the associated PUCCHs of the serving cells #(K1+1)-#(K1+K2) are located on the serving cell #K1+2, as shown by the arrows D(1_2), D(2_2), . . . , D(K2_2).

Embodiment III

Figure 3:
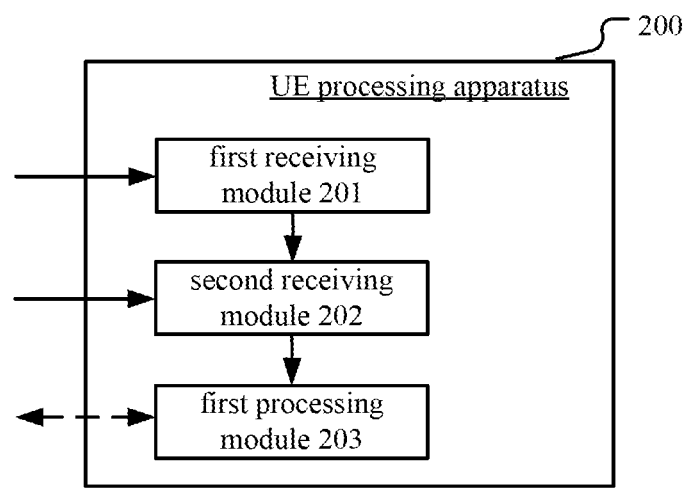
FIG. 3 is a structure diagram illustrating a processing apparatus used in a UE according to one embodiment of the present disclosure.

Embodiment III is a structure diagram illustrating a processing apparatus used in a UE, as shown in FIG. 3. In FIG. 3, the UE processing apparatus 200 in the UE includes a first receiving module 201, a second receiving module 202, and a first processing module 203.

The first receiving module 201 is used for receiving a high layer signaling to determine K sets of configuration information, the K sets of configuration information correspond to K serving cells respectively, and the configuration information comprising a first index, a second index, a third index and the working frequency band information. The second receiving module 202 is used for receiving a first signaling on a first serving cell, the first signaling comprising a fourth index and the scheduling information. The first processing module 203 is used for determining a second serving cell according to a first set of the configuration information and the fourth index of the first signaling, and transporting a wireless signal on the second serving cell according to the scheduling information of the first signaling.

In Embodiment III, the first signaling is a physical layer signaling, the transporting is receiving or transmitting (if the transmitting is transmitting, a two-way arrow of the first processing module 203 is an outputted arrow to the left; if the transporting is receiving, a two-way arrow of the first processing module 203 is an inputted arrow to the right), and the first serving cell and the second serving cell are respectively one of the K serving cells. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

In a first exemplary embodiment of Embodiment III, the fourth index is indicated by three bits of the first signaling, and the first index and the second index are respectively indicated by five bits.

In a second exemplary embodiment of Embodiment III, the K serving cells are active.

In a third exemplary embodiment of Embodiment III, in the K serving cells, a part of serving cells are TDD cells, and a part of serving cells are FDD cells. For the TDD cell, the working frequency band information includes {a central frequency point and a bandwidth of one downlink carrier}. For FDD cell, the working frequency band information includes at least former of {a central frequency point and a bandwidth of one downlink carrier, a central frequency point and a bandwidth of one uplink carrier}.

Embodiment IV

Figure 4:
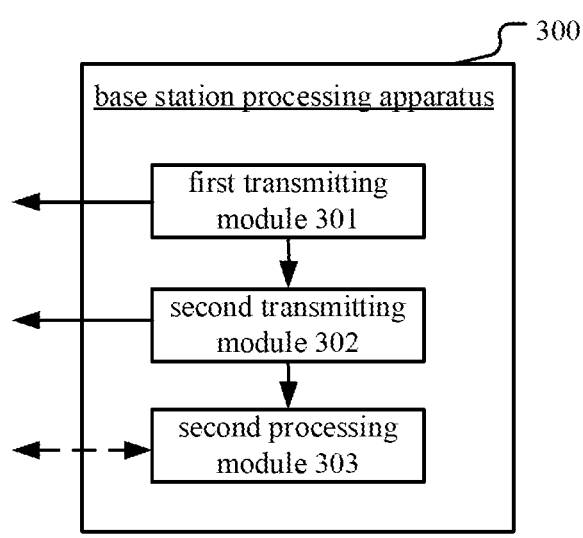
FIG. 4 is a structure diagram illustrating a processing apparatus used in a base station according to one embodiment of the present disclosure.

Embodiment IV is a structure diagram illustrating a processing apparatus used in a base station, as shown in FIG. 4. In FIG. 4, the base station processing apparatus 300 includes a first transmitting module 301, a second transmitting module 302 and a second processing module 303.

The first transmitting module 301 is used for transmitting a high layer signaling to indicate K sets of configuration information, the K sets of configuration information correspond to K serving cells respectively, and the configuration information comprising a first index, a second index, a third index and the working frequency band information. The second transmitting module 302 is used for transmitting a first signaling on a first serving cell, the first signaling comprising a fourth index and the scheduling information. The second processing module 303 is used for operating a wireless signal on the second serving cell according to the scheduling information of the first signaling, the second serving cell is indicated by a first set of the configuration information and the fourth index of the first signaling.

In Embodiment IV, the first signaling is a physical layer signaling, the operating is transmitting or receiving (if the operating is transmitting, a two-way arrow on the second processing module 303 is an outputted arrow to the left; if the operating is receiving, a two-way arrow on the second processing module 303 is an inputted arrow to the right), the first serving cell and the second serving cell are respectively one of the K serving cells. The high layer signaling is a RRC signaling. The first set of the configuration information is the configuration information corresponding to the first serving cell, a second set of the configuration information is the configuration information corresponding to the second serving cell. Each of the first indexes of the K sets of the configuration information is unique. A number of bits of the third index is less than a number of bits of the first index. The second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

In a first exemplary embodiment of Embodiment IV, the serving cells are FDD cells, and the working frequency band information includes at least former of {a center frequency band point and a bandwidth of one downlink carrier, a center frequency band point and a bandwidth of one uplink carrier}.

In a second exemplary embodiment of Embodiment IV, the indicating number of bits of the first index to the fifth index are: {5, 5, 3, 3, 5} in sequence.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. An enhanced carrier aggregation scheduling method in a UE, comprising the following steps:

Step A: receiving a high layer signaling to determine K sets of configuration information, the K sets of configuration information correspond to K serving cells respectively, and the configuration information comprising a first index, a second index, a third index and the working frequency band information;

Step B: receiving a first signaling on a first serving cell, the first signaling comprising a fourth index and the scheduling information;

Step C: determining a second serving cell according to a first set of the configuration information and the fourth index of the first signaling, and transporting a wireless signal on the second serving cell according to the scheduling information of the first signaling;

wherein the first signaling is a physical layer signaling, the transporting is receiving or transmitting, the first serving cell and the second serving cell are respectively one of the K serving cells; the first set of the configuration information is the configuration information corresponding to the first serving cell, a second set of the configuration information is the configuration information corresponding to the second serving cell; Each of the first indexes of the K sets of the configuration information is unique; a number of bits of the third index is less than a number of bits of the first index; and the second set of the configuration information is one set of the configuration information in the K sets of the configuration information satisfying the following conditions:

a value of the second index equals to a value of the first index of the first set of the configuration information;

a value of the third index equals to a value of the fourth index of the first signaling.

2. The enhanced carrier aggregation scheduling method in the UE according to claim 1, wherein the second set of the configuration information further comprises a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

3. The enhanced carrier aggregation scheduling method in the UE according to claim 1, wherein the fourth index is indicated by three bits of the first signaling.

4. The enhanced carrier aggregation scheduling method in the UE according to claim 1, wherein the first index and the second index are respectively indicated by five bits.

5. An enhanced carrier aggregation scheduling method in a base station, comprising the following steps:
   Step A: transmitting a high layer signaling to indicate K sets of configuration information, the K sets of configuration information correspond to K serving cells respectively, and the configuration information comprising a first index, a second index, a third index and the working frequency band information;
   Step B: transmitting a first signaling on a first serving cell, the first signaling comprising a fourth index and the scheduling information;
   Step C: operating a wireless signal on the second serving cell according to the scheduling information of the first signaling, the second serving cell is indicated by a first set of the configuration information and the fourth index of the first signaling;
   wherein the first signaling is a physical layer signaling, the operating is transmitting or receiving; the first serving cell and the second serving cell are respectively one of the K serving cells; the first set of the configuration information is the configuration information corresponding to the first serving cell, a second set of the configuration information is the configuration information corresponding to the second serving cell; Each of the first indexes of the K sets of the configuration information is unique; a number of bits of the third index is less than a number of bits of the first index; and the second set of the configuration information is one set of the configuration information in the K sets of the configuration information satisfying the following conditions:
      a value of the second index equals to a value of the first index of the first set of the configuration information;
      a value of the third index equals to a value of the fourth index of the first signaling.

6. The enhanced carrier aggregation scheduling method in the base station according to claim 5, wherein the second set of the configuration information further comprises a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

7. The enhanced carrier aggregation scheduling method in the base station according to claim 5, wherein the fourth index is indicated by three bits of the first signaling.

8. The enhanced carrier aggregation scheduling method in the base station according to claim 5, wherein the first index and the second index are respectively indicated by five bits.

9. A user equipment, comprising:
   a first module, for receiving a high layer signaling to determine K sets of configuration information, the K sets of configuration information correspond to K serving cells respectively, and the configuration information comprising a first index, a second index, a third index and the working frequency band information;
   a second module, for receiving a first signaling on a first serving cell, the first signaling comprising a fourth index and the scheduling information;
   a third module, for determining a second serving cell according to a first set of the configuration information and the fourth index of the first signaling, and transporting a wireless signal on the second serving cell according to the scheduling information of the first signaling;
   wherein the first signaling is a physical layer signaling, the transporting is receiving or transmitting, the first serving cell and the second serving cell are respectively one of the K serving cells; the first set of the configuration information is the configuration information corresponding to the first serving cell, a second set of the configuration information is the configuration information corresponding to the second serving cell; Each of the first indexes of the K sets of the configuration information is unique; a number of bits of the third index is less than a number of bits of the first index; and the second set of the configuration information is one set of the configuration information in the K sets of the configuration information satisfying the following conditions:
      a value of the second index equals to a value of the first index of the first set of the configuration information;
      a value of the third index equals to a value of the fourth index of the first signaling.

10. A base station equipment, comprising:
   a first module, for transmitting a high layer signaling to indicate K sets of configuration information, the K sets of configuration information correspond to K serving cells respectively, and the configuration information comprising a first index, a second index, a third index and the working frequency band information;
   a second module, for transmitting a first signaling on a first serving cell, the first signaling comprising a fourth index and the scheduling information;
   a third module, for operating a wireless signal on the second serving cell according to the scheduling information of the first signaling, the second serving cell is indicated by a first set of the configuration information and the fourth index of the first signaling;
   wherein the first signaling is a physical layer signaling, the operating is transmitting or receiving; the first serving cell and the second serving cell are respectively one of the K serving cells; the first set of the configuration information is the configuration information corresponding to the first serving cell, a second set of the configuration information is the configuration information corresponding to the second serving cell; Each of the first indexes of the K sets of the configuration information is unique; a number of bits of the third index is less than a number of bits of the first index; and the second set of the configuration information is one set of the configuration information in the K sets of the configuration information satisfying the following conditions:
      a value of the second index equals to a value of the first index of the first set of the configuration information;

a value of the third index equals to a value of the fourth index of the first signaling.

11. The base station equipment according to claim 10, wherein the second set of the configuration information further comprises a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

12. The base station equipment according to claim 10, wherein the fourth index is indicated by three bits of the first signaling.

13. The base station equipment according to claim 10, wherein the first index and the second index are respectively indicated by five bits.

14. The user equipment according to claim 9, wherein the second set of the configuration information further comprises a fifth index, the first signaling is a physical layer signaling for scheduling a downlink signal, the transporting is receiving, a PUCCH associated with the second serving cell is located on a third serving cell, the third serving cell is one of the K serving cells, the configuration information of the third serving cell is a third set of the configuration information, and the third set of configuration information is a set of configuration information among the K sets of configuration information, in which a value of the first index equals to a value of the fifth index in the second set of the configuration information.

15. The user equipment according to claim 9, wherein the fourth index is indicated by three bits of the first signaling.

16. The user equipment according to claim 9, wherein the first index and the second index are respectively indicated by five bits.

* * * * *